United States Patent
Andrade

(10) Patent No.: US 10,541,742 B1
(45) Date of Patent: Jan. 21, 2020

(54) DOWN-CONVERTER ASSEMBLY FOR SIMULTANEOUS CONVERSION OF DISJOINT SIGNALS

(71) Applicant: The Boeing Company, Chicago, IL (US)

(72) Inventor: Ray Andrade, Riverside, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/537,047

(22) Filed: Aug. 9, 2019

(51) Int. Cl.
*H04B 1/18* (2006.01)
*H04B 7/00* (2006.01)
*H04B 7/08* (2006.01)
*H04B 1/00* (2006.01)
*H04B 7/0408* (2017.01)

(52) U.S. Cl.
CPC ......... *H04B 7/0817* (2013.01); *H04B 1/0078* (2013.01); *H04B 1/18* (2013.01); *H04B 7/0408* (2013.01)

(58) Field of Classification Search
CPC .. H04B 1/06; H04B 1/006; H04B 1/16; H04B 1/18; H04B 1/40; H04B 7/0408; H04B 7/0452; H04B 7/18513; H04W 52/0206; H04W 88/06
USPC .... 455/12.1, 269, 272, 273, 277.1, 280, 417
See application file for complete search history.

(56) References Cited

U.S. PATENT DOCUMENTS

| | | | |
|---|---|---|---|
| 4,876,737 A | 10/1989 | Woodworth et al. | |
| 6,917,815 B2 | 7/2005 | Hajimiri et al. | |
| 7,889,135 B2 | 2/2011 | Blaser et al. | |
| 8,463,324 B1 | 6/2013 | Kormanyos et al. | |
| 8,644,367 B2 * | 2/2014 | Nagaishi ............. | H01Q 3/2682 455/562.1 |
| 9,258,072 B2 * | 2/2016 | Wu ........................ | H03D 7/14 |
| 9,288,697 B2 * | 3/2016 | Chen ..................... | H04W 24/08 |
| 9,344,039 B2 * | 5/2016 | Din ....................... | H04B 1/1027 |
| 9,548,778 B2 * | 1/2017 | Bardy .................... | H04B 1/18 |
| 9,577,704 B2 | 2/2017 | Balter et al. | |
| 9,667,467 B2 | 5/2017 | Bonebright et al. | |
| 9,761,939 B2 | 9/2017 | Pietila et al. | |
| 9,887,759 B2 * | 2/2018 | Elmakias ............. | H04B 7/0837 |
| 2018/0262218 A1 | 9/2018 | Eng et al. | |
| 2018/0331450 A1 * | 11/2018 | Zhu .................... | H01R 13/4362 |

* cited by examiner

*Primary Examiner* — Quochien B Vuong
(74) *Attorney, Agent, or Firm* — Miller, Matthias & Hull LLP

(57) ABSTRACT

A converter assembly system and method down-converts high frequency communication signals. A first down-converter converts a first input signal to a first intermediate frequency (IF) signal, and a second down-converter converts a second input signal to a second IF signal. A switching assembly, operatively connected to the first and second down-converters, is configured to operate in a first state, in which the first IF signal is routed to a first output and the second IF signal is routed to a second output, and a second state, in which the first and second IF signals are combined into a composite intermediate signal and the composite intermediate signal is routed to at least one of the first output or the second output.

20 Claims, 5 Drawing Sheets

DOWN-CONVERTER ASSEMBLY FOR SIMULTANEOUS CONVERSION OF DISJOINT SIGNALS

TECHNICAL FIELD

The present disclosure relates generally to systems and methods used in high frequency down-conversion receivers such as in satellite communication systems.

BACKGROUND

In the field of satellite communications, there is a growing trend for compact, lightweight solutions for phased array antenna systems while maintaining performance and expanding flexibility. There is also a desire for the capability to monitor multiple frequencies while maintaining a small footprint. Thus, there exists a need for a compact, lightweight phased array antenna system with the capability to receiving multiple beams.

SUMMARY

In accordance with one aspect of the present disclosure, a converter assembly for a phased array antenna system includes a first input configured to receive a first input signal in one of a first frequency band or a second frequency band, and a second input configured to receive a second input signal in one of the first frequency band or the second frequency band. A first down-converter is operatively connected to the first input, the first down-converter being configured to down-convert the first input signal to a first intermediate signal. A second down-converter is operatively connected to the second input, the second down-converter being configured to down-convert the second input signal to a second intermediate signal. A switching assembly is operatively connected to the first down-converter and the second down-converter, the switching assembly configured to operate in a first state, in which the first intermediate signal is routed to a first output and the second intermediate signal is routed to a second output, and a second state, in which the first intermediate signal and the second intermediate signal are combined into a composite intermediate signal and the composite intermediate signal is routed to the first output or the second output.

In accordance with another aspect of the present disclosure, A phased array antenna (PAA) system includes a first receive antenna configured to receive a first input beam in one of a first frequency band or a second frequency band, and a second receive antenna configured to receive a second input beam in one of the first frequency band or the second frequency band. A converter assembly is operatively connected to the first and second receive antennas and includes a converter enclosure. The converter assembly includes a first input operatively connected to the first receive antenna and configured to receive a first input signal corresponding to the first input beam in one of the first frequency band or the second frequency band, and a second input operatively connected to the second receive antenna and configured to receive a second input signal corresponding to the second input beam in one of the first frequency band or the second frequency band. A first down-converter is operatively connected to the first input and configured to down-convert the first input signal to a first intermediate signal, and a second down-converter is operatively connected to the second input and configured to down-convert the second input signal to a second intermediate signal. A switching assembly is operatively connected to the first down-converter and the second down-converter, the switching assembly configured to operate in a first state, in which the first intermediate signal is routed to a first output and the second intermediate signal is routed to a second output, and a second state, in which the first intermediate signal and the second intermediate signal are combined into a composite intermediate signal and the composite intermediate signal is routed the first output or the second output.

In accordance with another aspect of the present disclosure, a method is provided for down-conversion that includes receiving a first input signal in one of a first frequency band or a second frequency band, receiving a second input signal in one of the first frequency band or the second frequency band, down-converting the first input signal to a first intermediate signal, and down-converting the second input signal to a second intermediate signal. The first intermediate signal and the second intermediate signal are received at a switching assembly that is operated in a first state or a second state, wherein in the first state the first intermediate signal is routed to a first output and the second intermediate signal is routed to a second output, and in the second state the first intermediate signal and the second intermediate signal are combined into a composite intermediate signal and the composite intermediate signal is routed to the first output or the second output.

Figure 1:
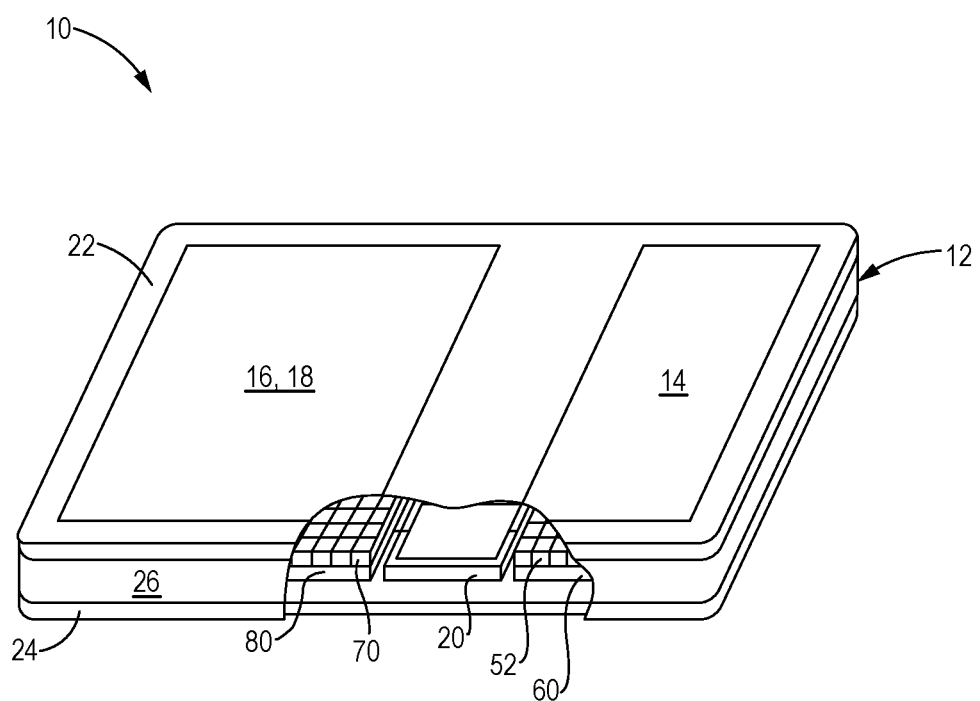
FIG. 1 is an illustration of a perspective view of a phased array antenna system in accordance with an example of the present disclosure.

While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

The following detailed description will illustrate the general principles of the system and method, examples of which are additionally illustrated in the accompanying drawings. In the drawings, like reference numbers indicate identical or functionally similar elements.

While the exemplary system and method may be embodied in different forms, there is shown in the drawings, and herein will be described in detail, a specific example for a phased array antenna (PAA) system with an integrated transceiver forming part of a satellite communication (SATCOM) system. The PAA system can be used in various scenarios. For example, the PAA system can be implemented in Communications On-The-Move (COTM) systems such as those mounted on a terrestrial or aerial mobile platform, it can be implemented as a portable unit manually transported by a user, or a fixed location device with the understanding that the present disclosure is to be considered an exemplification of the principles of the system and method, and is not intended to limit the system and method to that as illustrated and described herein. For example, the system and method may be implemented as military, commercial, or personal applications for high frequency communication. Therefore, unless otherwise noted, features disclosed herein may be combined together to form additional combinations.

The system and method is configured to concurrently receive at least two disjoint high frequency radiofrequency (RF) signals from the same or at least two unique satellites. Disjoint RF signals are independent RF signals that can coexist on the same port without interfering with one another.

FIG. 1 illustrates an isometric cutaway view of an example of the PAA system 10. The PAA system 10 includes a common housing 12 which integrates at least one electronically steerable, phased array transmit ($T_x$) antenna 14; a dual-mode receive ($R_x$) antenna which integrates a first $R_x$ antenna 16 and a second $R_x$ antenna 18 into a single electronically steerable, phased array $R_x$ antenna; and a converter assembly 20 which houses at least a downconverter which will be described in greater detail below.

Figure 2:
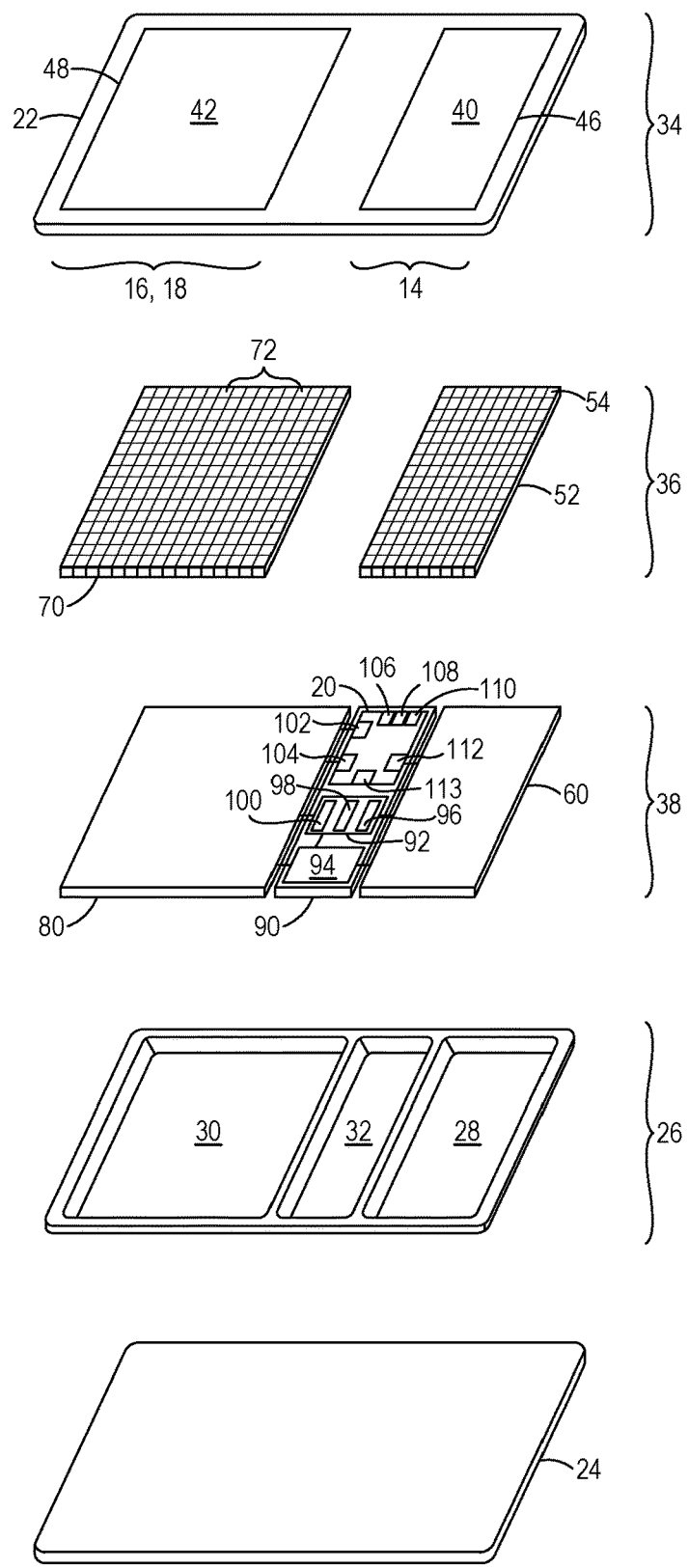
FIG. 2 is an illustration of an exploded view of the phased array antenna system in accordance with an example of the present disclosure.

With reference to FIGS. 1 and 2, an exploded view of the PAA system 10 is illustrated in accordance with an example of the present disclosure. The housing 12 defines a top cover 22, a bottom cover 24, and a chassis 26 therebetween. A gasket may be employed between the chassis 26 and the top and bottom covers 22, 24 to form an air and/or water tight seal to protect a first chassis cavity 28, a second chassis cavity 30, and a third chassis cavity 32. The first chassis cavity 28 houses at least the $T_x$ antenna 14; the second chassis cavity 30 houses the first and second receive antennas 16, 18; and the third chassis cavity 32 houses at least the converter assembly 20. The chassis cavities 28, 30, 32 are isolated from one another to reduce signal interference therebetween. The chassis 26 may be formed of any suitable material such as an RF shielding material including, but not limited to, cast or machined aluminum, metallized plastic, composite materials, or the like. The internal cavities may be separated by a plurality of walls to isolate the antennas 14, 16, 18 from one another and from the converter assembly 20. While shown as rectangular and planar in shape, it should be appreciated that the size and shape of the $T_x$ and $R_x$ antennas 14, 16, 18 may vary in both shape and size according to the intended application.

Each antenna 14, 16, 18 is collectively formed from a plurality of layers including an aperture layer 34, an element layer 36, and a signal distribution layer 38. The various layers will be discussed in further detail with reference to FIGS. 2 and 3 below.

The aperture layer 34 includes at least the top cover 22 which is integrally formed with a $T_x$ aperture 40 and an $R_x$ aperture 42. The top cover 22 is attached to and covers the top of the chassis 26. The $T_x$ aperture 40 is configured to convey electronically steered radiofrequency (RF) signals generated by the $T_x$ antenna 14, while the $R_x$ aperture 42 is configured to convey electronically steered RF signals received by the $R_x$ antennas 16, 18. In an example, the first and second $R_x$ antennas 16, 18 can be integrated into a single dual-mode $R_x$ antenna. However, it should be appreciated that each antenna 14, 16, 18 can be separate and distinct antennas.

The $T_x$ aperture 40 includes a $T_x$ impedance matching layer 46 configured to optimize the impedance match between the $T_x$ antenna 14 and the free air space thereby improving efficiency of the transmission of RF signals by the PAA system 10. Similarly, the receive antennas 16, 18 include an $R_x$ impedance matching layer 48 configured to optimize the impedance match between the $R_x$ antennas 16, 18 and the free air space thereby improving efficiency of the reception of RF signals by the PAA system 10. One example of an impedance matching cover is a wide angle, multilayer dielectric laminate; however, other impedance matching covers are also contemplated.

Adjacent to the $T_x$ impedance matching layer 46 is a $T_x$ element layer 52. The $T_x$ aperture 40 is collectively formed by the $T_x$ impedance matching layer 46 and the $T_x$ element layer 52. The $T_x$ element layer 52 includes an array of radiative $T_x$ elements 54 configured to transmit RF signals over the air. One example of a $T_x$ element 54 includes a microstrip patch antenna etched onto a surface of a printed circuit board (PCB). Another example includes monolithic microwave integrated circuits (MMIC's) each associated with a corresponding waveguide; however, other radiative elements are also contemplated. It should be appreciated that the size, shape, material, and the like are also design parameters of the $T_x$ antenna 14 and the $T_x$ elements 54 are chosen according to the intended operating frequency range. In an example, a SATCOM system which includes the PAA system 10 may operate in the Ka band frequency range. Typically, these systems operate in the 30/20 gigahertz (GHz) band, where a 30/20 GHz band includes an uplink frequency centered at approximately 30 GHz, with a bandwidth of approximately 2 GHz, and a downlink frequency centered at approximately 20 GHz, also with a bandwidth of approximately 2 GHz. In this example, the parameters of the $T_x$ element layer 52 and $T_x$ elements 54 would be chosen to operate in the approximate 29-31 GHz frequency band. However, it should be appreciated that the PAA system 10 may operate in any number of frequency bands according to the intended operating frequencies.

Adjacent to the $T_x$ element layer 52 is the $T_x$ signal distribution layer 60. The $T_x$ signal distribution layer 60 is in signal communication with the $T_x$ element layer 52. The $T_x$ signal distribution layer 60 includes a plurality of signal paths and/or dividers in various stages to divide an output $T_x$ signal into sub-signals and distribute the sub-signals to the corresponding individual $T_x$ elements 54. It should be appreciated that the $T_x$ element layer 52 and the $T_x$ signal distribution layer 60 may be formed together as a single layer or may be separate layers as shown in the example of FIG. 2.

Similarly, the $R_x$ aperture 42 includes a corresponding $R_x$ element layer 70 adjacent to the $R_x$ impedance matching layer 48. The $R_x$ element layer 70 includes an array of radiative $R_x$ elements 72 which are parameterized according to the intended operating frequency range of the corresponding $R_x$ antenna 16, 18. In the example of a SATCOM system which operates in the Ka band, the parameters of the $R_x$ element layer 70 would be chosen to operate in the approximate 19-21 GHz frequency band. Each individual $R_x$ element 72 is configured to receive RF signals and can be formed on a PCB as an array in which each $R_x$ element 72 is configured to receive RF signals therefrom. One example of an $R_x$ element 72 may include a microstrip patch antenna or a MMIC etched onto a surface of the PCB.

In this example, each $R_x$ element 72 is a multi-mode $R_x$ element 72 configured to receive at least a first input beam transmitted within a first frequency band and a second input beam transmitted within a second frequency band. The first and second frequency bands are disjoint, independent RF frequency bands. Each $R_x$ element 72 can separate or differentiate between the first and second input beams based on various signal characteristics. For example, the input beams may be linearly polarized and orthogonal to one another such as vertically polarized and horizontally polarized. Alternatively, the input beams may be circularly polarized in opposing directions to one another such as right handed (clockwise) polarized and left hand (anti-clockwise) polarized. Each $R_x$ element includes at least one transmission line for each input beam, such as a first and second transmission line, which outputs a corresponding input signal, such as a first input signal and a second input signal. The $R_x$ element layer 70 receives the first and second input beams and converts the input beams into a plurality of sub-signals where each sub-signal corresponds to at least one $R_x$ element.

Adjacent to the $R_x$ element layer 70 is the $R_x$ signal distribution layer 80. The $R_x$ signal distribution layer 80 is in signal communication with the $R_x$ element layer 70. The $R_x$ signal distribution layer 80 includes a plurality of signal paths and/or combiners in various stages to combine the sub-signals corresponding to the first and second input beams from the individual $R_x$ elements 72 into a first and second input signal which are then routed to a first input and second of the converter assembly. The first sub-signals correspond to the first input beam and are combined into the first input signal, and the second sub-signals correspond to the second input beam and are combined into the second input signal. It should be appreciated that the $R_x$ element layer 70 is the $R_x$ signal distribution layer 80 may be formed together as a single layer or may be separate layers as shown in the example of FIG. 2

As previously mentioned, the $T_x$ antenna 14 is comprised of at least the $T_x$ aperture 40, the $T_x$ element layer 52, and the $T_x$ signal distribution layer 60 which are all closely stacked together and disposed within the first chassis cavity 28. Similarly, the $R_x$ antennas 16, 18 are comprised of at least the $R_x$ aperture 42, the $R_x$ element layer 70, and the $R_x$ signal distribution layer 80 which are all also closely stacked together and disposed within the second chassis cavity 30. Still part of the signal distribution layer 38, but isolated from the $T_x$ and $R_x$ signal distribution layers 60, 80 is a converter and control layer (CCL) 90.

The CCL 90 includes plurality of modules including at least a controller module 92, a power module 94, and the converter assembly 20. While illustrated as a single layer, the CCL 90 can include a plurality of co-planar layers each including at least one module thereby reducing interfering between the various components.

The controller module 92 may include a processing unit 96, for example, a microprocessor, a logic device (e.g., a programmable logic device configured to perform processing operations), or a digital signal processing (DSP) device, one or more memory units 98 for storing executable instructions (e.g., software, firmware, or other instructions), and/or any other appropriate combination of processing device and/or memory to execute instructions to perform any of the various operations described herein. The controller module 92 is configured to interface with the individual $T_x$ and $R_x$ elements 54, 72 of the element layer 36 to provide control signals to control the shape, steering, scanning, and the like for beamforming the received and/or transmitted RF input/output beams. The memory unit 98 can be a non-transitory computer readable medium, for example, such as computer readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

The controller module 92 may also include a reference signal input 100 which is configured to receive at least one externally generated reference clock signal. In one example the reference signal input 100 receives at least two reference clock signals which can be used by the converter assembly 20 to down-convert input signals to intermediate frequency (IF) signals and/or up-convert IF output signals for transmission at the intended operating frequency range. For example, the reference clock signal may be multiplexed with an input IF signal for up-conversion and transmission by the $T_x$ antenna 14. It should be appreciated that the controller module 92 may also include a reference signal module configured to generate the at least one reference signal rather than relying on an externally provided reference signal.

The power module 94 is configured to provide direct current (DC) power to at least the $T_x$ and $R_x$ element layer 52, 70; the $T_x$ and $R_x$ signal distribution layers 60, 80; the controller module 92, and the converter assembly 20 to power the various operations thereof.

Figure 3:
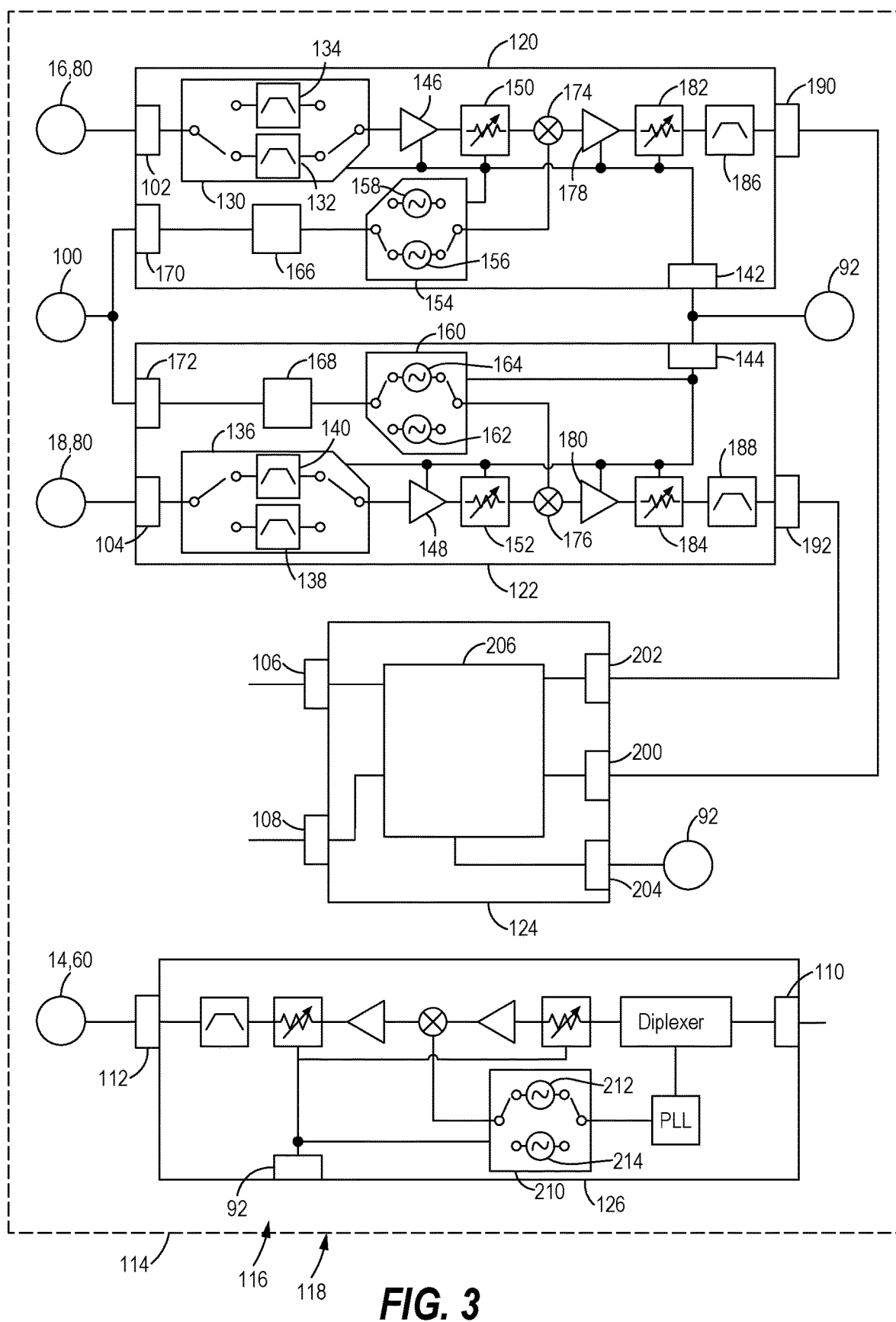
FIG. 3 is an illustration of a block diagram showing functional elements of a converter assembly in accordance with an example of the present disclosure.

With reference to FIGS. 2 and 3, a schematic diagram of the converter assembly 20 is illustrated. The converter assembly 20 is operatively connected to at least the $T_x$ signal distribution layer 60, the $R_x$ signal distribution layer 80, the controller module 92, and the power module 94. The converter assembly 20 includes input/output (I/O) ports for interfacing with the abovementioned components. A first input 102 and a second input 104 are in signal communication with the $R_x$ signal distribution layer 80 to receive the first input signal and the second input signal which correspond to the first input beam and second input beam, respectively. The first and second input signals are down-converted into a first and a second IF signals, respectively, and outputted via a first output 106 and a second output 108.

A $T_x$ IF input 110 is configured to receive an external IF signal for up-conversion and is outputted thereafter via $T_x$ output 112. The $T_x$ output 112 is in signal communication with the $T_x$ signal distribution layer 60 to transmit the up-converted IF signal thereto and transmit a $T_x$ output beam from the $T_x$ antenna 14. The converter assembly 20 also includes an interface input 113 to receive DC power, control signals, and reference signals from the power module 94 and the controller module 92, respectively.

Continuing with FIG. 3, the converter assembly 20 includes a converter enclosure 114 which defines an internal space 116 and an exterior or external surface 118. Disposed within the internal space 116 is a first down-converter 120, a second down-converter 122, a switching assembly 124, and an up-converter 126. The converter enclosure 114 isolates the components disposed within the internal space 116 from interference such as RF interference, ground plane interference, electrical noise, crosstalk, and the like from other components disposed within the housing 12 or from external interference. In addition, the first down-converter 120, second down-converter 122, switching assembly 124, and up-converter 126 are also isolated from one another to reduce interference and noise as well. In this example, each of the first down-converter 120, second down-converter 122, switching assembly 124, and up-converter 126 is disposed on a separate PCB and tightly packed within the internal space 116 to form the integrated converter assembly 20. However, other arrangements are also contemplated such as disposing the first down-converter 120, second down-converter 122, switching assembly 124, and up-converter 126 onto the same PCB with sufficient spacing to mitigate interference or any other known method of electrical and RF isolation.

The first down-converter 120 is configured to receive the first input signal at the first input 102, and to down-convert the received first input beam and subsequent first input signal to the first IF signal. Similarly, the second down-converter 122 is configured to receive the second input signal at the second input 104, and to down-convert the received second input beam and subsequent second input signal to the second IF signal. High frequency signals are generally down-converted to intermediate frequencies to improve signal processing, filtering, amplification, transmission, and the like. In this example, microwave RF signals, such as those in the Ka band, would require relatively expensive transmission lines to overcome the high losses incurred during the amplification and conveyance of a high frequency microwave signals to a remote base station or terminal. By converting the input beam to an intermediate frequency, relatively inexpensive coaxial cables can be used to carry the IF signals to the base station.

The first down-converter 120 is configured to receive and down-convert the first input signal originating from the first $R_x$ antenna 16 at a first frequency band and a second frequency band. Likewise, the second down-converter 122 is configured to receive and down-convert the second input signal originating from the second $R_x$ antenna 18 at the first frequency band and the second frequency band. As previously mentioned, the PAA system 10 includes a dual-mode $R_x$ antenna that integrates the first and second $R_x$ antennas 16, 18 such that the PAA system 10 can simultaneously receive the first input beam and the second input beam. Consequently, the converter assembly 20 can simultaneously down-convert in real-time the resultant first and second input signals to the first and second IF signals, respectively. In this arrangement, the PAA system 10 can down-convert at least two disjoint RF signal emanating from the same or two separate sources. In this example, the converter assembly 20 of the PAA system 10 can receive and down-convert a first input beam in the 19.2-20.2 GHz frequency band from a first satellite while simultaneously receiving a second input beam in the 20.2-21.2 GHz frequency band. Vice versa, the first input beam can be in the 20.2-21.2 GHz frequency band while the second input beam can be in the 19.2-20.2 GHz frequency band. It should be appreciated the both the first and second input beams can be in the same frequency band as well.

The first down-converter 120 includes a first multi-bandpass filter 130 operatively connected to the first input 102 and is selectively tunable between the first frequency band and the second frequency band. That is, the first multi-bandpass filter 130 includes a first bandpass filter 132 and a second bandpass filter 134 that will pass the input RF signal at either the first frequency band or the second frequency band, respectively. Similarly, the second down-converter 122 includes a second multi-bandpass filter 136 operatively connected to the second input 104 and is selectively tunable between the first frequency band and the second frequency band. The second multi-bandpass filter 136 includes a third bandpass filter 138 and a fourth bandpass filter 140 that will pass the input RF signal at either the first frequency band or the second frequency band, respectively. The controller module 92 is configured to transmit control signals or commands to the first and second down-converters 120, 122 via control ports 142, 144 to select the bandpass frequency band of the first and second multi-bandpass filters 130, 136.

Switches within the first multi-bandpass filter 130 are configured to select either the first or second bandpass filter 132, 134 based on the corresponding control signal, and switches within the second multi-bandpass filter 136 are configured to select either the third or fourth bandpass filter 138, 140 based on the corresponding control signal.

The first and second bandpass signals are processed by an amplifier 146, 148, such as a low noise amplifier, and by a variable attenuator 150, 152 before heterodyning the first bandpass signal to the first IF signal and the second bandpass signal to the second IF signal. To convert or shift the frequency band of the first bandpass signal, the first down-converter 120 includes a first local oscillator (LO) bank 154 which is configured to be selectively switchable between a first LO 156 and a second LO 158. The first LO 156 is configured to oscillate to produce a sine wave at a first injection frequency corresponding to the first frequency band and the second LO 158 is configured to oscillate at a second injection frequency which corresponds to the second frequency band. The first LO bank 154 includes a plurality of switches controlled via the controller module 92 to selectively switch between the first and the second LO 156, 158.

Likewise, the second down-converter 122 includes a second LO bank 160 which is configured to be selectively switchable between a third LO 162 and a fourth LO 164. The third LO 162 is configured to produce a sine wave at a first injection frequency corresponding to the first frequency band and the fourth LO 164 is configured to oscillate at the second injection frequency which corresponds to the second frequency band. The second LO bank 160 includes a plurality of switches controlled via the controller module 92 to selectively switch between the third LO and the fourth LO 162, 164.

The first and second down-converters 120, 122 include a first and second phase-locked loop (PLL) 166, 168, respectively. The first and second PLL 166, 168 are configured to phase lock the first and second LO banks 154, 160, respectively, based on the reference signal received at the reference signal input 100. The first and second down-converters 120, 122 include a reference input 170, 172, respectively, to receive the reference signal. The first LO bank 154 is configured to generate a first injection signal and the second LO bank 160 is configured to generate a second injection signal.

To generate the first and second IF frequency signals, the down-converters 120, 122 each include a mixer 174, 176 to heterodyne each bandpass signal with the corresponding injection LO signal to generate a corresponding IF signal. The first and second IF signals are respectively processed by amplifiers 178, 180 and variable attenuators 182, 184 and then filtered by IF bandpass filters 186, 188. The resulting first IF signal is output via a first IF output 190 and the second IF signal is output via a second IF output 192.

According to FIG. 3, the first down-converter 120 is currently configured to receive the first input signal at the first frequency band and the second down-converter is configured to receive the second input signal at the second frequency band. More specifically, the controller module 92 generated and transmitted control signals via control port 142 to select the first bandpass filter 132 to pass the first frequency band and the first LO 156 to oscillate at the first injection frequency. Likewise, the controller module 92 generated and transmitted control signals via control port 144 to select the fourth bandpass filter 140 to pass the second frequency band and the fourth LO 164 to oscillate at the second injection frequency. As illustrated, the first and third bandpass filters 132, 138 both pass the first frequency band, while the second and fourth bandpass filters 134, 140 both pass the second frequency band. Similarly, the first and third LO's 156, 162 both oscillate at the first injection frequency, while the second and fourth LO's 158, 164 both oscillate at the second injection frequency. This arrangement allows for the controller module 92 to selectively switch either down-converter 120, 122 to receive either the corresponding input signal at either the first or second frequency band. Thus, the converter assembly 20 can simultaneously down-convert two independent input signals having disjoint frequency bands where the two input signals correspond to input beams originating from the same or different satellites. Conversely, the converter assembly 20 can simultaneously down-convert the two input signals having two like frequency bands where the two input signals correspond to input beams originating from the same or different satellites.

The converter assembly includes a switching assembly 124 that is configured to operate in multiple states. For example, in a first state the switching assembly 124 routes the first IF signal to the first output 106 and the second IF signal to the second output 108. In the second state, the switching assembly 124 combines the first and second IF signals into a composite IF signal and routes the composite IF signal to at least one of the first output 106 or the second output 108. The composite IF signal may include the disjoint first and second frequency bands such that they do not interfere with one another. The switching assembly 124 includes a first IF input 200 for receiving the first IF signal, a second IF input 202 for receiving the second IF signal, and a control port 204 for receiving control signals from the controller module 92. The switching assembly 124 may include a switching matrix 206 which is configured to operate in the first and second states. Still further, the switching assembly 124 may be configured to operate in a third state, in which the first and second IF signals are combined into a composite IF signal that is routed to both the first and second outputs 106, 108. For example, in one arrangement where the first output 106 is connected to a first work station and the second output 108 is connected to a second work station, the switching matrix 206 can route the composite IF signal to either of the work stations when operating in the second state, or to both of the first and second work stations when operating in the second state.

In an alternative example, the controller module 92 is configured to determine whether the first input beam and the second input beam are disjoint. The controller module 92 can determine the frequency band of the ensuing first and second input signals and can compare to signals to determine whether they are disjoint or not. If the first and second input signals are disjoint, then the controller module 92 generates and transmits control signals to the switching matrix 206 to combine the first and second IF signals to the composite IF signal and routes the composite IF signal to the user selected first output 106 or second output 108. If the controller module 92 determines that the first and second input beams are not disjoint, then the controller module 92 controls the switching matrix 206 to route the first IF signal to the first output 106 and the second IF signal to the second output 108, thereby avoiding interference from non-disjoint signals being combined. It should be appreciated that the switching matrix 206 can also route the first IF signal to second output 108 and the second IF signal to the first output 106 if commanded by the user.

The switching assembly 124 may include isolation features that ensure the first down-converter 120, the second down-converter 122, and the up-converter 126 do not inject interference into the routed first IF signal, second IF signal, and/or composite IF signal. The switching assembly 124 may also include a cooling feature such as a cooling loop, heatsink, fan, thermoelectric, or the like configured to actively and/or passively cool the switching matrix 206. The cooling feature may extend to the first and second down-converters 120, 122 as well as the $T_x$ up-converter 126 or any other component within the converter assembly. The controller module 92 may be configured to receive a temperature signal generated and transmitted by at least one temperature sensor in or near the converter assembly 20 or any one of the components disposed therein.

As previously mentioned, the $T_x$ up-converter 126 is configured to receive an external IF signal, e.g. a third workstation, at the $T_x$ IF input 110 and the up-convert the signal for transmission by the $T_x$ antenna 14. More specifically, the $T_x$ up-converter 126 is configured to receive an external composite IF signal which includes an external IF signal combined with the frequency reference signal. The external composite IF signal is separated with a diplexer or the like into the separate external IF signal and the frequency reference signal. The frequency of the reference signal is detected and/or received by the controller module 92 which generates a corresponding control signal to control a third LO bank 210 to generate a corresponding injection signal based on the reference signal frequency. The selected fifth or sixth LO 212, 214 generates the injection signal which is then mixed with the external IF signal and amplified to generate the up-converter signal for transmission via the $T_x$ antenna 14.

While this example illustrates a PAA system 10 with one $T_x$ antenna 14 and two $R_x$ antennas 16, 18, it should be appreciated that the PAA system 10 may include any number of a $T_x$ and/or $R_x$ antennas 14, 16, 18 according to the intended application. It follows that the number of corresponding down-converters 120, 122 and up-converters 126 as well as the number of corresponding LO's 156, 158, 164, 166, 182, 184 within each of the first and second LO bank 154, 160; the number of corresponding input ports 102, 104, 170, 172, 110 and output ports 106, 108, 112, 190, 192; and the like will change according to the number of corresponding antennas 14, 16, 18. Accordingly, the controller module 92 can be configured to handle any number of $T_x$ or $R_x$ antennas 14, 16, 18. For example, if the PAA system included two $T_x$ antennas, then the PAA system 10 would likewise include two $T_x$ up-converters to simultaneously transmit two output beams. Similarly, if the PAA system 10 includes three $R_x$ antennas, the PAA system 10 would include two down-converters. Furthermore, the $T_x$ and $R_x$ apertures 40, 42; the $T_x$ and $R_x$ element layers 52, 70; the $T_x$ and $R_x$ signal distribution layers 60, 80; the first and second LO banks 154, 160; the first and second multi-bandpass filters 130, 136; the switching matrix 206; and the like would have to be adapted to accommodate the varying number of $T_x$ and $R_x$ antennas.

Figure 4:
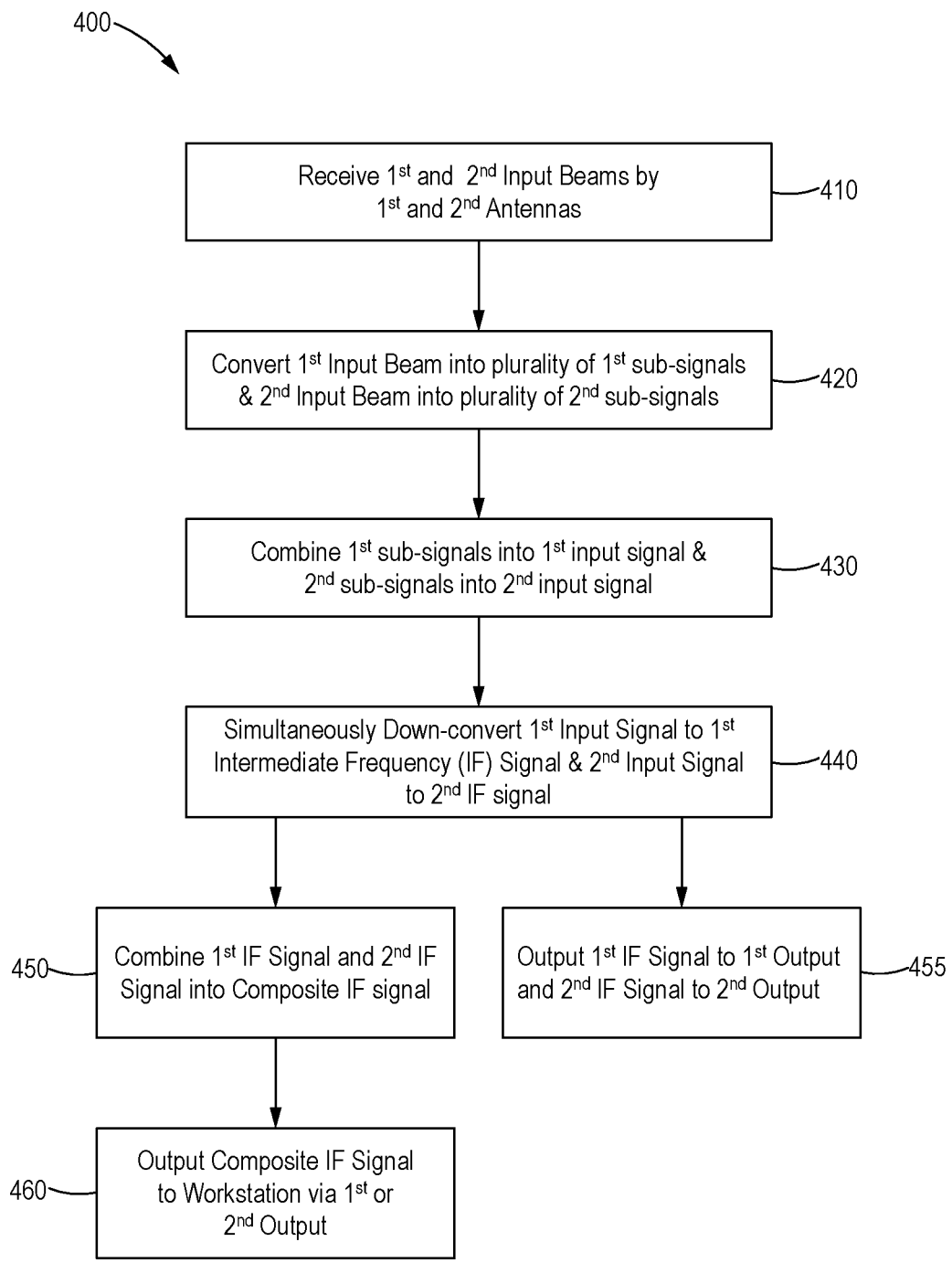
FIG. 4 is a flowchart of an example method for simultaneous signal conversion.

With reference to FIG. 4, a flowchart 400 of an example method for simultaneous signal conversion of at least two input beams is presented. The PAA system 10 receives the first input beam at the first $R_x$ antenna 16 and receives the second input beam at the second $R_x$ antenna 18, block 410. The first and second input beams are converted to the first and second sub-signals, respectively, by the $R_x$ element layer 70, block 420. The first and second sub-signals are then combined by the $R_x$ signal distribution layer 80 into the first and second input signals, respectively, block 430. The first and second input signals are then routed to the first input 102 and second input 104, respectively, of the converter assembly 20. The converter assembly 20 then simultaneously down-converts the first and second input signals with a first down-converter 120 and a second down-converter 122 into the first and second IF signals, respectively, block 440. The switching assembly 124 of the converter assembly 20 receives the first and second IF signals and operates in a first state or a second state. In the first state shown at block 455, the switching assembly 124 routes the first IF signal to the first output 106 and the second IF signal to the second output 108. In the second state, the switching assembly 124 combines the first IF signal and the second IF signal into a composite IF signal, block 450, and routes the composite IF signal to at least one of the first output 106 or the second output 108, block 460.

Figure 5:
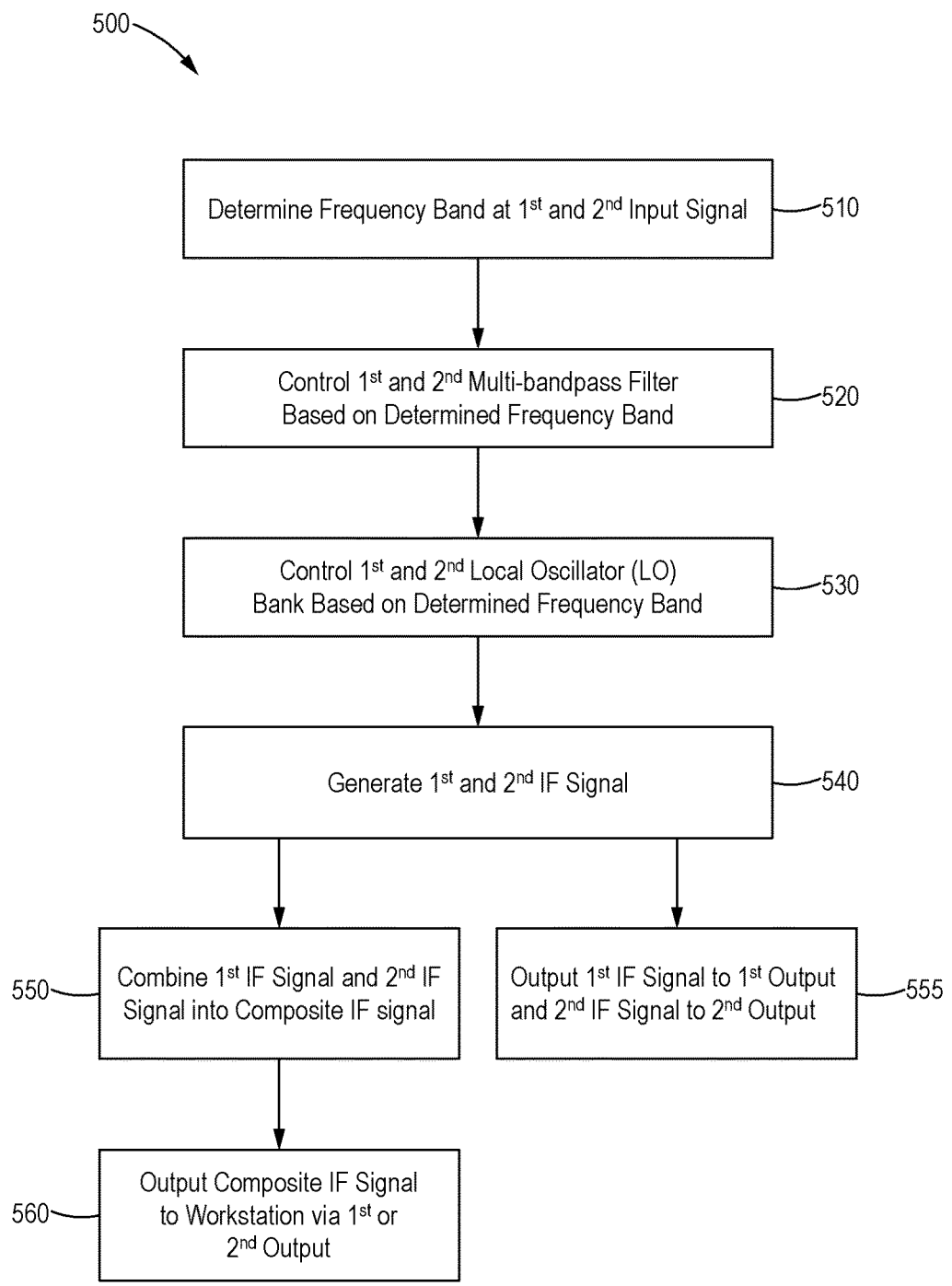
FIG. 5 is a flowchart of an example method for simultaneous down-conversion.

With reference to FIG. 5, a flowchart 500 of an example of simultaneous down-conversion of at least two input signals is presented. The controller module 92, operatively connected to the converter assembly 20, determines the frequency band of the first and second input signals, block 510. The controller module 92 controls the first multi-bandpass filter 130 to switch to the corresponding first or second bandpass filter 132, 134 based on the detected frequency band of the first input signal, and controls the second multi-bandpass filter 136 to switch to the corresponding third or fourth bandpass filter 138, 140 based on the detected frequency band of the second input signal, block 520. Similarly, the controller module 92 controls the first LO bank 154 to switch to the corresponding first or second LO 156, 158 based on the detected frequency band of the first input signal, and controls the second LO bank 160 to switch to the corresponding third LO 162 or the fourth LO 164 based on the detected frequency band of the second input signal, block 530. The first injection frequency generated by the first LO bank 154 is multiplexed with the band-passed first input signal to generate the first IF signal; similarly, the second injection frequency generated by the second LO bank 160 is multiplexed with the band-passed second input signal to generate the second IF signal, block 540. The switching assembly 124 of the converter assembly 20 receives the first and second IF signals, as well as a control signal from the controller module 92 to operate the switching assembly 124 in a first state or a second state. For example, if the controller module 92 determines that the first and second input signals are not disjoint, the control signal operates the switching assembly 124 in the first state, wherein the first and second IF signals are not combined and the individual IF signals are routed to a selected output 106, 108, block 555. Alternatively, if the controller module 92 determines that the first and second signals are disjoint, the control signals operates the switching assembly 124 in the second state, wherein the switching assembly 124 combines the first IF signal and the second IF signal into a composite IF signal, block 550, and routes the composite IF signal to at least one of the first output 106 or the second output 108, block 560. Operation of the switching assembly in the first or second state, and selection of the output(s) to which the IF signals are sent, may be selected by a user at the workstation.

The examples described in detail above are within the scope of the appended claims. It is contemplated that numerous other modifications and variations may be created taking advantage of the disclosed approach. In short, it is the applicant's intention that the scope of the patent issuing herefrom be limited only by the scope of the appended claims.

What is claimed is:

1. A converter assembly for a phased array antenna system, the converter assembly comprising:
    a first input configured to receive a first input signal in one of a first frequency band or a second frequency band;
    a second input configured to receive a second input signal in one of the first frequency band or the second frequency band;
    a first down-converter operatively connected to the first input, the first down-converter being configured to down-convert the first input signal to a first intermediate signal;
    a second down-converter operatively connected to the second input, the second down-converter being configured to down-convert the second input signal to a second intermediate signal; and
    a switching assembly operatively connected to the first down-converter and the second down-converter, the switching assembly configured to operate in a first state, in which the first intermediate signal is routed to a first output and the second intermediate signal is routed to a second output, and a second state, in which the first intermediate signal and the second intermediate signal are combined into a composite intermediate signal and the composite intermediate signal is routed to the first output or the second output.

2. The converter assembly of claim 1, further comprising:
    a converter enclosure defining an internal space isolated from interference from an exterior, the converter enclosure housing at least the first down-converter, the second down-converter, and the switching assembly.

3. The converter assembly of claim 2, wherein the first down-converter, the second down-converter, and the switching assembly are isolated from one another within the internal space.

4. The converter assembly of claim 1, wherein the switching assembly further comprises a switching matrix.

5. The converter assembly of claim 1, wherein:
    the first down-converter comprises a first local oscillator, operating at an injection frequency of the first frequency band, and a second local oscillator, operating at an injection frequency of the second frequency band; and
    the second down-converter comprises a third local oscillator, operating at the injection frequency of the first frequency band, and a fourth local oscillator, operating at the injection frequency of the second frequency band.

6. The converter assembly of claim 5, further including:
    a reference input configured to receive a reference signal having at least one of a first reference frequency and a second reference frequency, wherein the first local oscillator, the second local oscillator, the third local oscillator, and the fourth local oscillator are phase-locked based on the reference signal.

7. The converter assembly of claim 5, wherein the first frequency band and the second frequency band are disjoint.

8. The converter assembly of claim 1, further comprising:
    a first multi-bandpass filter operatively connected to the first input and configured to selectively pass at least one of the first frequency band or the second frequency band; and
    a second multi-bandpass filter operatively connected to the second input and configured to selectively pass at least one of the first frequency band or the second frequency band.

9. The converter assembly of claim 1, wherein the switching assembly is further configured to operate in a third state, in which the first intermediate signal and the second intermediate signal are combined into a composite intermediate signal and the composite intermediate signal is routed to both of the first output and the second output.

10. A phased array antenna (PAA) system, comprising:
a first receive antenna configured to receive a first input beam in one of a first frequency band or a second frequency band;
a second receive antenna configured to receive a second input beam in one of the first frequency band or the second frequency band;
a converter assembly operatively connected to the first and second receive antennas, the converter assembly having a converter enclosure comprising:
a first input operatively connected to the first receive antenna and configured to receive a first input signal corresponding to the first input beam in one of the first frequency band or the second frequency band;
a second input operatively connected to the second receive antenna and configured to receive a second input signal corresponding to the second input beam in one of the first frequency band or the second frequency band;
a first down-converter operatively connected to the first input and configured to down-convert the first input signal to a first intermediate signal;
a second down-converter operatively connected to the second input and configured to down-convert the second input signal to a second intermediate signal; and
a switching assembly operatively connected to the first down-converter and the second down-converter, the switching assembly configured to operate in a first state, in which the first intermediate signal is routed to a first output and the second intermediate signal is routed to a second output, and a second state, in which the first intermediate signal and the second intermediate signal are combined into a composite intermediate signal and the composite intermediate signal is routed to the first output or the second output.

11. The PAA system of claim 10, further comprising:
a controller operatively connected to at least the first down-converter, the second down-converter, and the switching assembly, the controller being configured to:
determine a frequency band of the first input signal and a frequency band of the second input signal;
generate and transmit control signals to the first down-converter to switch to the frequency band of the first input signal, and to the second down-converter to switch to the frequency band of the second input signal; and
control the switching assembly to operate in the first state or the second state.

12. The PAA system of claim 11, wherein the controller is configured to determine when the frequency band of the first input signal and the frequency band of the second input signal are disjoint; and
when the frequency band of the first input signal and the frequency band of the second input signal are not disjoint, generate and transmit a control signal to the switching assembly to operate in the first state.

13. The PAA system of claim 11, wherein:
the first down-converter comprises a first local oscillator having an injection frequency of the first frequency band, and a second local oscillator having an injection frequency of the second frequency band;
the second down-converter comprises a third local oscillator having the injection frequency of the first frequency band, and a fourth local oscillator having the injection frequency of the second frequency band; and
the controller is further configured to:
generate and transmit a control signal to selectively switch between the first local oscillator and the second local oscillator based on the frequency band of the first input signal; and
generate and transmit a control signal to selectively switch between the third local oscillator and the fourth local oscillator based on the frequency band of the second input signal.

14. The PAA system of claim 13, wherein the controller is further configured to:
receive a reference signal having at least one of a first reference frequency or a second reference frequency; and
phase-lock the first local oscillator, the second local oscillator, the third local oscillator, and the fourth local oscillator based on the reference signal.

15. The PAA system of claim 11, wherein the controller is further configured to generate and transmit a control signal to a first multi-bandpass filter operatively connected to the first input to selectively pass at least one of the first frequency band or the second frequency band, and to a second multi-bandpass filter operatively connected to the second input to selectively pass at least one of the first frequency band or the second frequency band.

16. A method for down-conversion, comprising:
receiving a first input signal in one of a first frequency band or a second frequency band;
receiving a second input signal in one of the first frequency band or the second frequency band;
down-converting the first input signal to a first intermediate signal;
down-converting the second input signal to a second intermediate signal;
receiving the first intermediate signal and the second intermediate signal at a switching assembly; and
operating the switching assembly in a first state or a second state, wherein in the first state the first intermediate signal is routed to a first output and the second intermediate signal is routed to a second output, and in the second state the first intermediate signal and the second intermediate signal are combined into a composite intermediate signal and the composite intermediate signal is routed to the first output or the second output.

17. The method of claim 16, further including:
receiving a first input beam at a first receive antenna, wherein the first input signal corresponds to the first input beam;
receiving a second input beam at a second receive antenna, wherein the second input signal corresponds to the second input beam; and
wherein the first frequency band and the second frequency band are disjoint.

18. The method of claim 16, further including:
selectively switching between a first local oscillator and a second local oscillator based on the frequency band of the first input signal, the first local oscillator having an injection frequency of the first frequency band and the second local oscillator having an injection frequency of the second frequency band; and selectively switching between a third local oscillator and a fourth local oscillator based on the frequency band of the second input signal, the third local oscillator having the injection frequency of the first frequency band and the fourth local oscillator having the injection frequency of the second frequency band.

19. The method of claim 18, further comprising:

generating and transmitting a reference signal having at least one of a first reference frequency or a second reference frequency; and phase-locking the first local oscillator, the second local oscillator, the third local oscillator, and the fourth local oscillator based on the reference signal.

20. The method of claim 18, further comprising:

generating and transmitting a control signal to a first multi-bandpass filter to selectively pass at least one of the first frequency band or the second frequency band, and to a second multi-bandpass filter to selectively pass at least one of the first frequency band or the second frequency band.

* * * * *